April 12, 1960　　　C. H. HERR, JR　　　2,932,212
GEAR SHIFT INTERLOCK AND DETENT MECHANISM
Filed Aug. 20, 1958　　　　　　　　　　　3 Sheets-Sheet 1

Inventor
Charles H. Herr Jr.
by James C. Olson
Attorney

April 12, 1960  C. H. HERR, JR  2,932,212
GEAR SHIFT INTERLOCK AND DETENT MECHANISM
Filed Aug. 20, 1958  3 Sheets-Sheet 2

Inventor
Charles H. Herr Jr.
Attorney

April 12, 1960 C. H. HERR, JR 2,932,212
GEAR SHIFT INTERLOCK AND DETENT MECHANISM
Filed Aug. 20, 1958 3 Sheets-Sheet 3

Inventor
Charles H. Herr Jr.
by James O. Alfson
Attorney

United States Patent Office
2,932,212
Patented Apr. 12, 1960

2,932,212
GEAR SHIFT INTERLOCK AND DETENT MECHANISM

Charles H. Herr, Jr., Springfield, Ill., assignor to Allis-Chalmers Manufacturing Company, Milwaukee, Wis.

Application August 20, 1958, Serial No. 756,124

12 Claims. (Cl. 74—477)

This invention relates generally to a gear shifting device for a change speed transmission and the like and is more particularly concerned with a detent and interlock mechanism for the shift rods of said device.

In tractor type vehicles having change speed transmissions wherein gears are shiftable by axially reciprocable shift rods, there is a serious problem of preventing the shiftable gears from accidental moving out of their preselected positions particularly under operating conditions causing a sudden impact to the tractor which tends to jar the gears. It is well known that accidental shifting may result in stripping or breakage of gears or in jamming the entire transmission. To prevent accidental shifting various types of interlock and detent mechanisms have been suggested. These conventional mechanisms, however, particularly the type adapted to accommodate more than two shift rods have not been entirely satisfactory from the standpoint of reliability, simplicity of construction and cost of manufacture.

It is, therefore, an object of the present invention to provide an improved interlock mechanism which is entirely reliable and which will overcome the objections and meet the requirements hereinbefore outlined in a completely satisfactory manner.

It is a more specific object of the present invention to provide an interlock mechanism for a group of at least three shift rods wherein movement of two of the shift rods will be prevented upon shifting of the third shift rod.

It is a further object of the present invention to provide an interlock for the two outside shift rods of a group of three whereby movement of one of the outside rods will be prevented upon shifting of the other.

Another object of the present invention is to provide a detent and interlock mechanism for releasably maintaining a group of three shift rods in neutral and shifted positions and to prevent shifting of two of the shift rods upon shifting of a third shift rod out of neutral position.

These and other objects and advantages of the invention will be evident when the following description is read in connection with the appended drawings in which.

Figure 1:
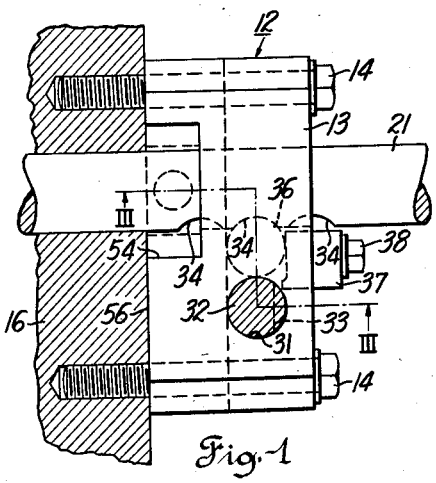
Fig. 1 is a top view of a detent and interlock mechanism for shift rods which is attached to a transmission housing, only a fragmentary portion of the latter being shown.

Referring to Figs. 1 through 4, the interlock and detent mechanism is indicated generally by the reference character 12 having a support housing 13 attached by cap screws 14 onto the transmission housing indicated generally by the reference character 16, best shown in Fig. 1. Axially reciprocable shift rods 21, 22 and 23 are suitably journaled respectively in bores 24, 26 and 27 formed in housing 13 and transmission housing 16. Rods 21, 22 and 23 are coplanar and are disposed in spaced parallel relation. Three channels 28 are formed respectively on the outside face of housing 13 at right angles to bores 24, 26 and 27 which are formed therein. The spaces between channels 28 form outwardly projecting flanges 29. A bore 31 is formed in and extends transversely of flanges 29. A lock shaft 32 is suitably journaled in bore 31 and is disposed transversely of and in spaced relation from shift rods 21, 22 and 23. Lock shaft 32 has three flatted portions 33 on its periphery which are spaced longitudinally of the shaft and correspond to channels 28. The depth of each flatted portion 33 is equal to the depth of any one of the three locking recesses 34 which are provided on the surface of each of the shift rods 21, 22 and 23 and which are adjacent the surface of lock shaft 32. Three locking pins 36 are carried respectively in channels 28 and are positioned respectively between recesses 34 in shift rods 21, 22 and 23 and the portion of lock shaft 32 wherein flatted portions 33 are formed. Pins 36 are respectively retained in channels 28 by a retainer member 37 which is fastened onto housing 13 by cap screws 38.

Figures 2, 3, 4:
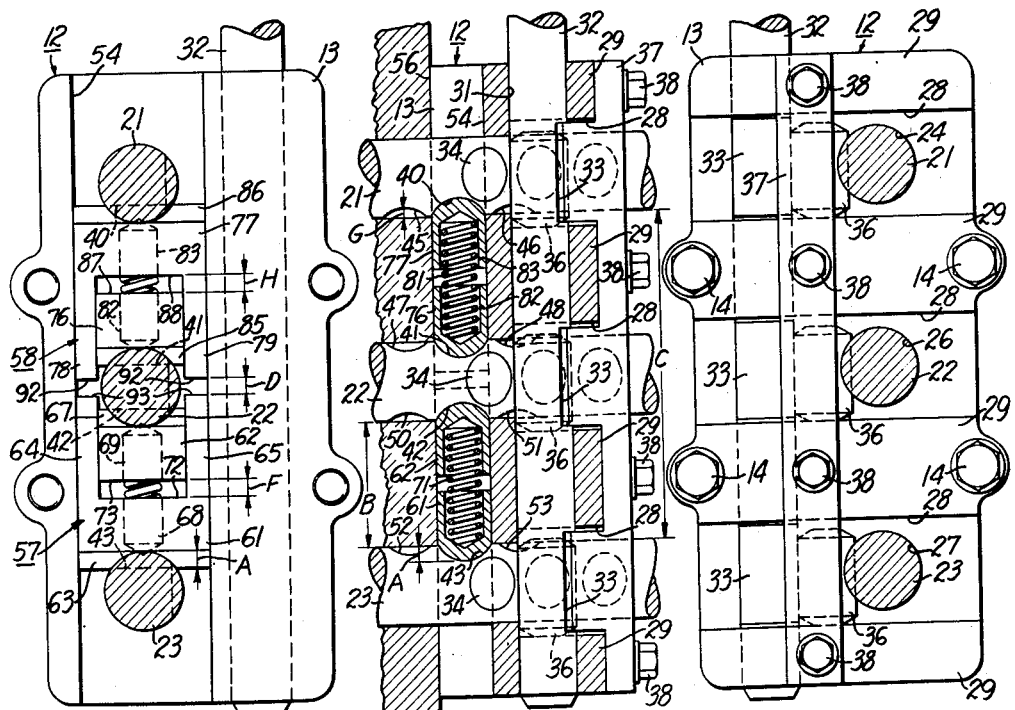
Fig. 2 is a view of the end of the detent and interlock mechanism that abuts the transmission housing in the assembled condition as shown in Fig. 1 and illustrates the position of the locking elements when the shift rods are in neutral position.
Fig. 3 is a sectional view of said mechanism taken along section lines III—III of Fig. 1.
Fig. 4 is a view of said mechanism from the outside end which is the end opposite from that shown in Fig. 2.

The centrally located locking recesses of the group of three recesses 34 provided in each shift rod correspond to the neutral position and the pair of outside recesses correspond to the shifted positions of each rod. Locking pins 36 are cylindrical having a surface which is complementary to the concave surface of recesses 34 and a diameter which is equal to the distance between the adjacent surfaces respectively of lock shaft 32 and any one of shift rods 21, 22, 23 plus the depth of one of the locking recesses 34. Lock shaft 32 is to be connected by suitable linkage to the master clutch control lever (not shown) in such a manner that the cylindrical periphery of shaft 32 will be presented in abutting relationship to the surface of the three lock pins 36 thereby maintaining the latter in registration respectively with a corresponding recess 34 in each shift rod (as illustrated in Figs. 1 and 4) in order to prevent axial movement of shift rods 21, 22 and 23 when the master clutch is engaged. Upon disengagement of the master clutch, lock shaft 32 is to be rotated 90 degrees thereby presenting the flatted portions 33 for engagement with the cylindrical surface of the locking pins 36 which allows the latter to move out of registration with their respective locking recesses 34 permitting axial movement of the shift rods.

From the foregoing description it will be seen that recesses 34, lock shaft 32 and locking pins 36 provide a positive locking mechanism for shift rods 21, 22 and 23 to prevent movement thereof during engagement of the master clutch.

Recessed portions 40, 41, 42 and 43 are provided respectively on opposite adjacent surfaces of rods 21, 22 and 23 and correspond to the neutral position for the shift rods. Recesses 45 and 46 correspond to predetermined shifted positions and are formed respectively at opposite sides of recess 40 longitudinally of shift rod 21. Recesses 47 and 48 which correspond to shifted positions are formed respectively on either side of recess 41 and recesses 50 and 51 which correspond to shifted positions are formed respectively on either side of recess 42, said recesses being disposed longitudinally of shift rod 22. Recesses 52 and 53 which correspond to shifted positions are formed respectively on either side of recess 43 longitudinally of shift rod 23. Recesses 40, 41, 42 and 43 are of an equal depth, indicated by reference character A, below the surface of the shift rods 21, 22 and 23 but are deeper than recesses 45, 46, 47, 48, 50, 51, 52 and 53 which are also of an equal depth which is indicated by reference character G. A channel 54 is formed on face 56 of housing 13. In the assembled condition channel 54 is adjacent to transmission housing 16 and extends along an axis transverse of and intersecting the axes of bores 24, 26 and 27. A pair of extensible and contractible locking members 57 and 58 are interposed respectively between shift rods 21 and 22 and between shift rods 22 and 23 and are slidably retained in channel 54 when face 56 of housing 13 is assembled in abutting relation with housing 16, as best shown in Figs. 1 and 3.

Referring to Figs. 2 through 5, locking member 57 includes a pair of locking elements 61 and 62. Locking element 61 is U-shaped having a cylindrical outer end portion 63 complementary to and selectively registerable with recesses 43, 52 and 53 of rod 23 and having opposite side portions 64 and 65 which extend partially around opposite sides of shift rod 22. Locking element 62 is slidably mounted between sides 64 and 65 of element 61 in telescopic relationship therewith having a cylindrical outer end portion 67 complementary to and selectively engageable with recesses 42, 50 and 51 in shaft 22. Locking elements 61 and 62 are provided respectively with coaxial bores 68 and 69 for receiving a helical compression spring 71 which acts between elements 61 and 62 urging telescopic movement in a direction tending to separate them. A pair of abuttable flat portions 72 and 73 is provided respectively on opposite inner surfaces of elements 61 and 62 which limits the amount of compression of spring 71 and thereby limits the minimum contracted distance between the outer end portion 63 and 67 which is equal in length to the distance B between opposite adjacent surfaces of shift rods 22 and 23 plus the depth A of recess 43, or in other words is equal to the distance A plus B, as shown in Fig. 3.

Locking member 58 is constructed similarly to locking member 57 and includes locking element 76 which is slidable in telescopic relationship between sides 78 and 79 of U-shaped locking element 77. A helical compression spring 81 acts between locking elements 76 and 77 being carried in coaxial bores 82 and 83 provided respectively therein. Locking elements 76 and 77 are provided respectively with cylindrical outer end portions 85 and 86 which are complementary to and selectively registerable respectively with recesses 40, 45 and 46 respectively of shift rod 21 and with recesses 41, 47 and 48 respectively of shift rod 22. A pair of opposite abuttable flat portions 87 and 88 are provided respectively on the inner surfaces of elements 76 and 77 to limit the minimum contracted distance between outer portions 87 and 88 of locking member 58 in the same manner as hereinbefore described for locking member 57. Sides 78 and 79 of locking element 77 extend partially around opposite sides of the center shift rod 22 from the opposite direction of sides 64 and 65 of locking element 61 so that end portions 92 of sides 78 and 79 are in opposed spaced relationship with end portions 93 of sides 64 and 65. End portions 92 and 93 in effect serve as a pair of abuttable portions to limit movement of locking elements 61 and 77 in a direction toward each other so that when abuttable portions 92 and 93 are engaged, the minimum distance between outer end portions 63 and 86 is equal to the distance C between adjacent surfaces of the outer shift rods 21 and 23 plus the depth A of recess 43 or in other words equal to the distance C plus A, shown in Fig. 3.

Although a means for shifting rods 21, 22 and 23 has not been illustrated, it is to be understood that any suitable mechanism for selectively operating the individual shift rods may be employed, of which there are several types all well known in the art.

*Operation*

Referring to Figs. 2 and 3, shift rods 21, 22 and 23 are shown in a neutral position wherein outer portions 85 and 86 of locking member 58 are biased into registration respectively into stop means or recesses 40 and 41 by spring 81; and outer portions 63 and 67 of locking member 57 are biased respectively into stop means or recesses 42 and 43 by spring 71. Since distance H between portions 87 and 88 is slightly greater than depth A of either of the recesses 40 or 41, distance F between portions 72 and 73 is slightly greater than depth A of either of the recesses 42 or 43; and distance D between portions 92 and 93 is slightly greater than depth A of either of the recesses 40 or 43, any one of rods 21, 22 or 23 may be individually shifted to either the left or right out of the neutral position.

Considering the neutral condition from the general point of view, locking members 57 and 58 including springs 71 and 81 and recesses 40, 41, 42 and 43 serve as a detent for releasably maintaining the shift rods 21, 22 and 23 in a neutral position.

Figure 6:
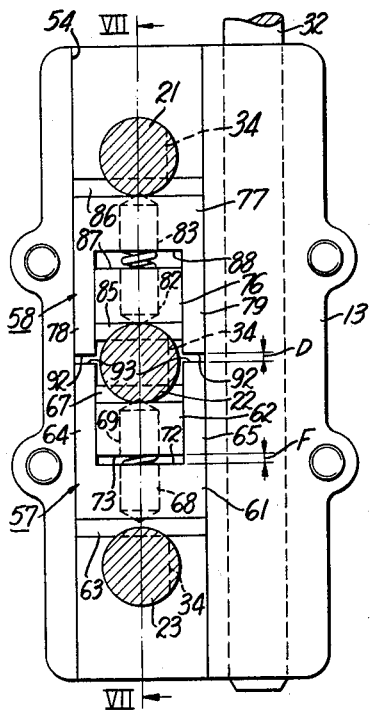
Fig. 6 is a view of said mechanism similar to Fig. 2 but shows the position of the locking elements when the lower shift rod is moved to the left into a shifted position.
Figure 7:
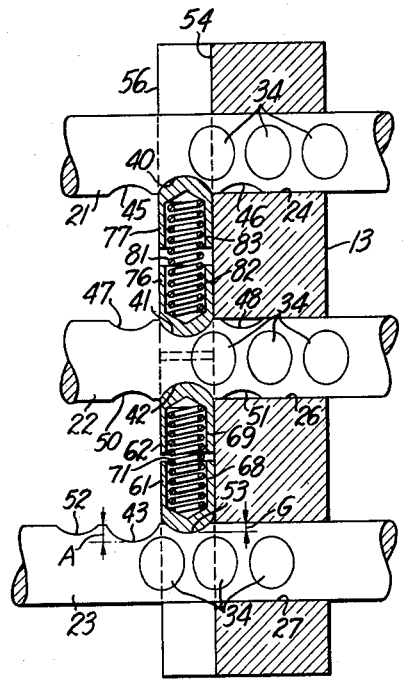
Fig. 7 is a sectional view of the mechanism taken along section line VII—VII in Fig. 6.
Figure 5:
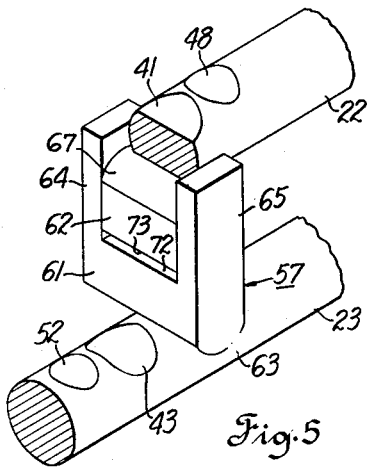
Fig. 5 is a perspective view of one pair of locking elements positioned between the center and lower shift rods which have been removed from the housing and are in the shifted position, as illustrated in Fig. 7.

Referring to Figs. 6 and 7, shift rods 21 and 22 are shown in a neutral position with shift rod 23 being shifted to the left (as viewed in Fig. 7) into a predetermined shifted position. In this condition shift rod 21 is locked from movement since the distance D between abuttable portion 92 and 93 is less than the depth of recess 40; and therefore, outer portion 86 is maintained in cooperative engagement with recess 40 of shift rod 21. Shift rod 22 is locked from axial movement because the distance F between the flat abuttable portions 72 and 73 is less than the depth A of recess 42 thereby retaining outer portion 63 in cooperative engagement with recess 42. Since distance F is slightly greater than the depth G of recess 53 and also because distance D is greater than depth G, outer portion 63 is yieldably maintained in registration with recess 53 of rod 23 thereby releasably retaining the latter in its leftward predetermined shifted position.

Considering this shifted condition from the general point of view, locking elements 61 and 77 and stop means or recess 40 serve as an interlock between the outer rod 21 and 23 to prevent movement of rod 21 from the neutral positions upon movement of rod 23 out of the neutral position. Locking member 57 and recess 42 serve as an interlock between rods 22 and 23 to prevent movement out of the neutral position of the former upon movement of the latter out of neutral position. At the same time recess 53 and locking member 57 including spring 71 serve as a detent mechanism for releasably retaining rod 23 in its leftward predetermined shifted position. It will be noted further that the same interlock and detent condition will prevail should shift rod 23 be shifted to the right out of neutral and into a predetermined shifted position whereby outer portion 63 would be in registration with recess 52.

Figure 8:
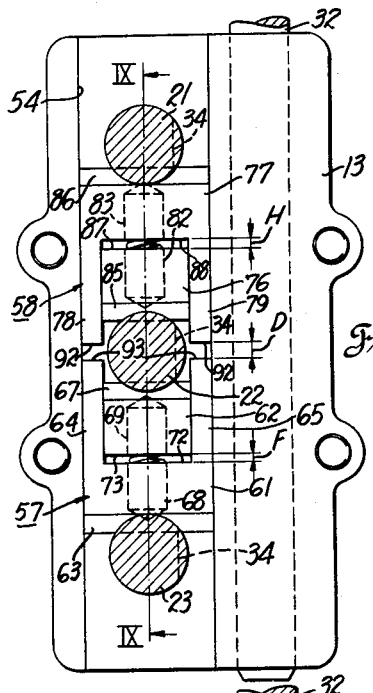
Fig. 8 is a view similar to Fig. 2 but shows the position of the locking elements when the middle shift rod is moved to the left into a shifted position.
Figure 9:
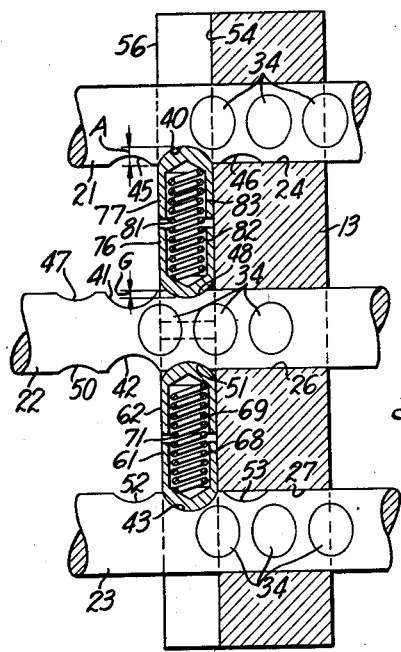
Fig. 9 is a sectional view taken along section line IX—IX in Fig. 8.

Referring now to Figs. 8 and 9, outer shift rods 21 and 23 are shown in neutral position and center shift rod 22 is moved to the left out of neutral position into a predetermined shifted position. Shift rod 23 is locked from movement in the neutral position due to the distance F between abutting portions 72 and 73 being less than the depth of recess 43 thereby retaining outer portion 63 in cooperative registration with recess 43. Shift rod 21 is also locked from axial movement in the neutral position because the distance H between abuttable flat portions 87 and 88 is less than depth A of recess 40 whereby outer end portion 86 is maintained in cooperative locking registration with recess 40. Since distance F between flat abutting portions 72 and 73, distance H between abutting portions 87 and 88 are both slightly greater than depth G of recesses 48 and 51 respectively and distance D between abuttable portions 92 and 93 is considerably larger than the depth G of recesses 48 and 51, outer portions 85 and 67 are yieldably maintained respectively in recesses 48 and 51 whereby rod 22 is releasably retained in the predetermined shifted position.

Considering this shifted condition from the general point of view, locking member 57 and recess 43 serve as an interlock between rods 22 and 23 whereby movement of the latter out of a neutral position is prevented upon movement of the former out of neutral position. Locking member 58 and recess 40 serve as an interlock between rods 22 and 21 whereby movement of the latter out of neutral position is prevented upon movement of the former out of the neutral position. Locking members 57 and 58 including helical springs 71 and 81 and recesses 48 and 51 serve as a detent for releasably retaining rod 22 in a shifted position. It will be noted also that the same interlock and detent condition will prevail upon movement of rod 22 to the right out of neutral into a predetermined shifted position wherein outer portions 85 and 67 would be in yieldable registration respectively with recesses 47 and 50.

Figure 10:
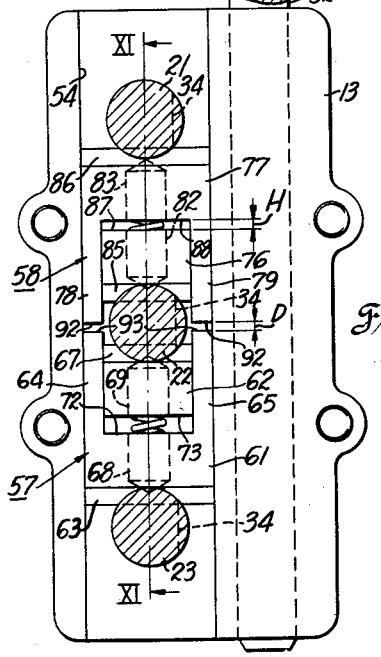
Fig. 10 is a view similar to Fig. 2 but shows the position of the locking elements when the top shift rod is moved to the left into a shifted position.
Figure 11:
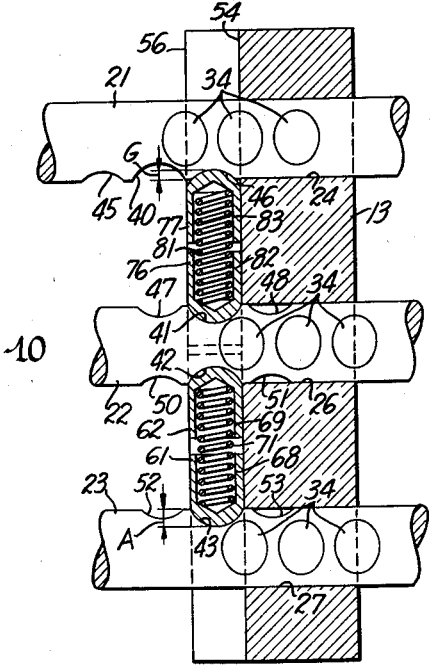
Fig. 11 is a sectional view taken along section line XI—XI in Fig. 10.

Referring to Figs. 10 and 11, a shifted position of the interlock and detent mechanism is shown wherein shift rod 21 has been shifted to the left into a predetermined shifted position and shift rods 22 and 23 are retained in a neutral position. Shift rod 23 is locked from movement out of the neutral by locking element 86 because the distance D between abuttable portions 92 and 93 is less than the depth A of recess 43 so that outer portion 63 is maintained in cooperative engagement with recess 43 of rod 23. Shift rod 22 is locked from movement in the neutral position by locking element 76 due to the distance H between abuttable portions 87 and 88 being less than depth A of recess 41 whereby outer portion 85 is maintained in cooperative locking engagement with recess 41 of rod 22. Since distance D is slightly greater than depth G of recess 46 in rod 21 and distance H is greater than depth G., outer portion 86 of locking element 77 is yieldably maintained in recess 46 by spring 81 thereby releasably maintaining rod 21 in the predetermined shifted position.

Considering this condition from the general point of view it will be seen that locking elements 61 and 77 and recess 43 serve as an interlock between rods 21 and 23 whereby movement of rod 23 is prevented upon movement of rod 21 out of neutral position. Locking member 58 and recess 41 serve as an interlock between rods 21 and 22 whereby movement of the latter is prevented upon movement of the former out of neutral position. Locking member 58 including coil spring 81 and recess 46 serves as a detent for releasably retaining rod 21 in a predetermined shifted position. It will also be noted that a similar interlock and detent relationship will prevail should shift rod 21 be moved to the right out of neutral position into a predetermined shifted position so that outer portion 86 would be in yieldable registration with recess 45.

From the foregoing detailed description it will be readily seen that a new and improved interlock mechanism has been illustrated for two outside shift rods 21 and 23 of a group of three as well as an interlock between the center rod 22 and both of the outside rods wherein movement of any one of the rods out of neutral position will prevent movement of the remaining two out of neutral position. Also a detent is provided which is operative to releasably maintain each of the three shift rods in a neutral position and in a predetermined shifted position. It will be noted further that the components of the hereinbefore described interlock and detent mechanism are extremely simple in character and are few in number which will result in a considerable saving in the cost of manufacture.

It should be understood that although only one embodiment of the present invention has been described and illustrated in detail it is not intended to limit the invention to the particular form herein otherwise than is necessitated by the scope of the appended claims.

What is claimed is:

1. In combination with a support, and first and third axially reciprocable shift rods being mounted on said support and disposed respectively in spaced parallel relation to and on opposite lateral sides of a second axially reciprocable shift rod also mounted on said support, an interlocking mechanism, comprising a pair of locking elements slidably mounted on said support for movement along an axis extending transversely of said shift rods, said pair of locking elements, respectively, operatively interposed between said first and second and said second and third shift rods, and extending partially around said second shift rod from opposite sides thereof in spaced abuttable relationship with one another, and opposite outer end portions respectively provided on said pair of locking elements and in cooperating engagement with said first and third shift rods respectively, whereby one of said first and third shift rods is locked from movement upon axial movement of the other of said first and third shift rods.

2. The combination comprising a support, and first and third axially reciprocable shift rods disposed respectively in spaced parallel relation to and on opposite lateral sides of a second axially reciprocable shift rod, said shift rods being mounted on said support so as to be individually shiftable from a neutral position into predetermined shifted positions, a pair of locking elements slidably mounted on said support for movement along an axis extending transversely of said shift rods, said pair of locking elements, respectively, operatively interposed between said first and second and said second and third shift rods and extending partially around said second shift rod from opposite sides thereof, in spaced abuttable relationship with one another, a pair of recesses respectively provided on said first and third shift rods, opposite outer end portions provided on said pair of locking elements cooperating respectively with said pair of recesses to releasably retain said first and third rods in the neutral position, one of said first and third shift rods being locked in the neutral position upon axial movement of the other of said first and third shift rods out of neutral position.

3. In combination with a support, and first and third axially reciprocable shift rods disposed respectively in spaced parallel relation to and on opposite lateral sides of a second axially reciprocable shift rod, said shift rods being mounted on said support so as to be individually shiftable frm a neutral position into predetermined shifted positions, an interlocking mechanism comprising a pair of U-shaped locking elements slidably mounted on said support for movement along an axis extending transversely of said shift rods, said pair of locking elements, respectively, operatively interposed between said first and second and said second and third shift rods and having side portions extending partially around said second shift rod from opposite sides thereof, oppositely spaced abuttable portion respectively presented by the ends of said side portions of said pair of locking elements, a pair of recesses respectively provided in the surfaces of said first and third shift rods, opposite outer end portions respectively adjoining the side portions of each of said pair of locking elements and respectively registerable with said recesses for releasably retaining said first and third shift rods in a neutral position, one of said outer end portions being maintained in locking engagement with the recess in one of said first and third shift rods upon axial movement of the other of said first and third shift rods out of the neutral position.

4. In combination with a support, and first and third axially reciprocable shift rods disposed respectively in spaced parallel relation to and on opposite lateral sides of a second axially reciprocable shift rod, said shift rods being mounted on said support and individually shiftable from a neutral position into predetermined shifted positions, an interlocking mechanism comprising a pair of U-shaped locking elements slidably mounted on said support for movement along an axis extending transversely of said shift rods, said pair of locking elements, respectively, operatively interposed between said first and second and said second and third shift rods and having side portions extending partially around said second shift rod from opposite sides thereof, a pair of recesses of equal depth being respectively formed on the surfaces of said first and third shift rods, an outer end portion adjacent the side portions of each of said pair of locking elements and respectively registerable with said recesses upon shifting said first and third shift rods into the neutral position, a pair of opposite abuttable portions respectively presented by the ends of said side portions of said pair of locking elements, said opposite abuttable portions being spaced from each other a distance slightly greater than the depth of one of said recesses during registration of the latter and said end portions so that one of said outer end portions is maintained in locking engagement with the recess in one of said first and third shift rods upon axial movement of the other of said first and third shift rods out of the neutral position.

5. In combination with a support, and first and third axially reciprocable shift rods mounted on said support and disposed respectively in spaced parallel relation to and on opposite lateral sides of a second axially reciprocable shift rod also mounted on said support, an interlocking mechanism comprising two pair of relatively movable locking elements being mounted on said support and operatively interposed respectively between and adjacent to and disposed on an axis extending transversely of said first and second shift rods and said second and third shift rods, the locking elements of each of said pairs having inner engaging portions for limiting relative contractible movement and having outer portions in cooperating engagement respectively with adjacent shift rods for limiting relative expansible movement, and a locking element of one of said pairs being engageable in abutting relationship with a locking element of the other of said pairs to limit relative movement therebetween in a direction toward each other, whereby said second shift rod and one of said first and third shift rods are locked from movement by respective locking elements upon axial movement of the other of said first and third shift rods.

6. In combination with a support, and first and third axially reciprocable shift rods disposed respectively in spaced parallel relation to and on opposite lateral sides of a second axially reciprocable shift rod, said shift rods being mounted on said support so as to be individually shiftable from a neutral position into predetermined shifted positions, an interlocking mechanism mounted on said support and comprising a recess on each of said shift rods, a first pair of coacting locking elements operatively interposed between and in cooperating yieldable engagement respectively with the recesses of said first and second shift rods upon shifting of these rods into the neutral position, a second pair of coacting locking elements operatively interposed between and in cooperating yieldable engagement respectively with the recesses of said second and third shift rods upon shifting of these rods into the neutral position, the locking elements of each of said pairs being relatively movable on an axis extending transversely of said shift rods, one of said locking elements of said first pair having a portion extending around said second shift rod and being engageable in abutting relationship with a corresponding portion of one of said locking elements of said second pair extending around said second shift rod, whereby one of said locking elements is maintained in locking engagement with the recess of one of said first and third shift rods upon axial movement of the other of said first and third shift rods out of said neutral position.

7. In combination with a support, and first and third axially reciprocable shift rods mounted on said support and disposed respectively in spaced parallel relation to and on opposite lateral sides of a second axially reciprocable shift rod also mounted on said support, an interlocking mechanism mounted on said support and comprising recesses formed respectively on adjacent surfaces of said shift rods, two pair of relatively movable locking elements operatively interposed respectively between and disposed on an axis extending transversely of said first and second shift rods and said second and third shift rods, the locking elements of each of said pairs having inner engaging portions for limiting relative contractible movement therebetween and having outer portions in cooperating engagement respectively with the recesses on adjacent shift rods for limiting relative expansible movement, and a locking element of one of said pair being engageable in abutting relationship with a locking element of the other of said pair to limit relative movement therebetween in a direction toward each other, whereby locking elements are maintained in locking engagement respectively with the recesses on said second shift rod and the recesses on one of said first and third shift rods upon axial movement of the other of said first and third shift rods.

8. In combination with a support, and first and third axially reciprocable shift rods mounted on said support and disposed respectively in spaced parallel relation to and on opposite lateral sides of a second axially reciprocable shift rod also mounted on said support, an interlocking mechanism mounted on said support and comprising a recess provided on each of the adjacent surfaces of said shift rods, a pair of expansible and contractible locking members disposed on an axis extending transversely of said shift rods, one of said pair of locking members operatively interposed between and in cooperating expansion limiting engagement respectively with the recesses of said first and second shift rods, and the other of said pair of locking members operatively interposed between and in cooperative expansion limiting engagement respectively with the recesses of said second and third shift rods, each of said locking members having limit means for limiting the amount of contraction, and one of said locking members having a portion extending partially around said second shift rod being engageable in abutting relationship with an opposite portion provided on the other of said locking members and extending partially around said second shift rod for limiting relative movement therebetween, whereby said second shift rod and one of said first and third shift rods are locked from movement upon unseating the corresponding locking member from engagement with the recess of the other of said first and third shift rods by axial movement of said other of the shift rods.

9. In combination with a support, and first and third axially reciprocable shift rods disposed respectively in spaced parallel relation to and on opposite lateral sides of a second axially reciprocable shift rod, said shift rods being mounted on said support so as to be individually shiftable from a neutral position into predetermined shifted positions, an interlocking mechanism mounted on said support and comprising recesses formed respectively on adjacent surfaces of said shift rods, two pair of relatively movable locking elements operatively interposed respectively between and disposed on an axis extending transversely of said first and second shift rods and said second and third shift rods, the locking elements of each of said pairs having inner engageable portions for limiting relative contractible movement, resilient means reacting between the locking elements of each pair for urging relative movement in the opposite direction and biasing said locking elements respectively into yieldable cooperating engagement with the recesses to releasably maintain said shift rods against axial movement, and a locking element of one of said pairs being cooperatively engageable in abutting relationship with a locking element of the other of said pairs for limiting relative movement therebetween in a direction toward each other, whereby locking elements are maintained in locking engagement respectively with the corresponding recesses of said second shift rod and one of said first and third shift rods respectively upon movement of the other of said first and third shift rods axially, thereby unseating the corresponding locking element from engagement with the recess in said other of the shift rods.

10. In combination with a support, and first and third axially reciprocable shift rods disposed respectively in spaced parallel relation to and on opposite lateral sides of a second axially reciprocable shift rod, said shift rods being mounted on said support, so as to be individually shiftable from a neutral position into predetermined shifted positions, an interlock and detent mechanism mounted on said support and comprising recess portions provided on adjacent surfaces of said shift rods, two pair of relatively movable locking elements, respectively, operatively interposed between said first and second shift rods and said second and third shift rods, said locking elements disposed on an axis extending transversely of said shift rods and registerable respectively with said recess portions, resilient means reacting between each of said pair of locking elements for yieldably retaining the latter in registration respectively with said recess portions upon shifting said rods into the neutral position, a pair of opposing abuttable portions provided respectively on the locking elements of each pair for limiting relative movement in a direction toward each other, and a locking element of one of said pair having a side portion extending around one side of said second shift rod being engageable in abutting relationship with a locking element of the other of said pair to limit relative movement therebetween in a direction toward each other, whereby locking elements are maintained in locking engagement respectively with the recess portions of said second shift rod and one of said first and third shift rods upon axial movement of the other of said first and third shift rods out of said neutral position.

11. In combination with a support, and first and third axially reciprocable shift rods disposed respectively in spaced parallel relation to and on opposite lateral sides of a second axially reciprocable shift rod, said shift rods being mounted on said support so as to be individually shiftable from a neutral position into predetermined shifted positions, an interlock and detent mechanism comprising a plurality of recess portions provided on adjacent surfaces of said shift rods, one of the recesses on each of said adjacent surfaces having a depth greater than the depth of the other recess portions, a pair of expansible and contractible locking members mounted on said support and, respectively, operatively interposed between said first and second shift rods and said second and third shift rods, said locking members being positioned for movement on an axis extending transversely of said shift rods and having outer end portions complementary to and registerable respectively with said recess portions, resilient means for urging expansion of each of said locking members thereby yieldably retaining said outer end portions in registration respectively with said recess portions, said resilient means being compressible so that the minimum contracted distance between said outer ends of said members is approximately equal to the distance between opposite surfaces of adjacent shift rods plus the depth of said one recess portion, a pair of opposing abuttable portions respectively provided on said locking members for limiting the minimum contracted distance between the outer end portion adjacent said first shift rod and the outer end portion adjacent said second shift rod to approximately the distance between the nearest surfaces of said first and third shift rods plus the depth of said one recess portion, whereby the outer ends of said locking members in registration with said recesses of greater depth in said second shift rod and one of said first and third shift rods are retained in locked engagement therewith upon axial movement of the other of said first and third shift rods into a predetermined shifted position.

12. In combination with a support, and first and third axially reciprocable shift rods disposed respectively in spaced parallel relation to and on opposite lateral sides of a second axially reciprocable shift rod, said shift rods being mounted on said support so as to be individually shiftable from a neutral position into predetermined shifted positions, an interlock and detent mechanism comprising recess portions corresponding respectively to said neutral and shifted positions provided on adjacent surfaces of said shift rods, each of the recess portions corresponding to said neutral position having a depth greater than the recess portions corresponding to the shifted portions, two pair of locking elements mounted on said support, respectively, operatively interposed between said first and second and said second and third shift rods, each of said pairs of locking elements positioned for relative expansible and contractible movement on an axis extending transversely of said shift rods, each of said locking elements having outer end portions complementary to and registerable respectively with the recess portions on adjacent surfaces of said shift rods, a resilient means acting between each of said pairs of locking elements for urging separation therebetween and biasing said outer end portions into registration respectively with said recess portions, said resilient means being compressible whereby the minimum distance between the outer ends of each pair of locking elements is approximately equal to the distance between opposite surfaces of adjacent shift rods plus the depth of said one recess portion, the locking elements respectively registerable with the recess portion of said first and third shift rods being U-shaped and respectively having a pair of side portions extending partially around said second shift rod, opposing abuttable portions respectively formed on the ends of said side portions of each of said U-shaped locking elements for limiting the minimum distance between the outer ends thereof to approximately the distance between the nearest surfaces of said first and third shift rods plus the depth of said one recess portion, whereby the outer ends of each of the said locking elements in registration with said one of the recess portions of greater depth on said second shift rod and one of said first and third shift rods are retained in locked engagement therewith upon axial movement of the other of said first and third shift rods axially so as to unseat the corresponding locking element from engagement with said one recess of said other of the shift rods.

References Cited in the file of this patent
UNITED STATES PATENTS

| | | |
|---|---|---|
| 2,280,641 | Snow | April 21, 1942 |
| 2,512,036 | Orr | June 20, 1950 |
| 2,654,268 | Perkins | Oct. 6, 1953 |
| 2,775,901 | Perkins | Jan. 1, 1957 |
| 2,847,871 | Schick | Aug. 19, 1958 |